United States Patent [19]

Brown et al.

[11] Patent Number: 5,372,407
[45] Date of Patent: Dec. 13, 1994

[54] LACED WHEEL HUB

[75] Inventors: William H. Brown, Menomonee Falls; Alvin R. Zemlicka, Elkhart Lake, both of Wis.

[73] Assignee: Harley-Davidson, Inc., Milwaukee, Wis.

[21] Appl. No.: 99,626

[22] Filed: Jul. 29, 1993

[51] Int. Cl.$^5$ .............................................. B60B 27/00
[52] U.S. Cl. ................................. 301/110.6; 301/110.5
[58] Field of Search ............... 301/105.1, 110.5, 110.6, 301/59

[56] References Cited

U.S. PATENT DOCUMENTS

| | | |
|---|---|---|
| 1,467,740 | 9/1923 | Thompson . |
| 1,492,850 | 5/1924 | Hubbard . |
| 1,511,291 | 10/1924 | McGrath . |
| 2,213,165 | 8/1940 | Kurzina, Jr. .......................... 192/6 |
| 2,349,220 | 5/1953 | Eksergian ........................ 301/105.1 |
| 2,781,231 | 2/1957 | Black ............................... 301/105.1 |
| 4,405,179 | 9/1983 | Boudreau et al. .................... 301/2.5 |
| 4,634,189 | 1/1987 | LeBlond et al. .................... 301/64.7 |
| 4,880,280 | 11/1989 | Panzica et al. ................... 301/110.5 |

FOREIGN PATENT DOCUMENTS

| | | | |
|---|---|---|---|
| 682184 | 5/1930 | France ............................... 301/110.5 |
| 1226929 | 8/1960 | France ............................... 301/110.5 |
| 2326787 | 12/1973 | Germany ......................... 301/110.5 |
| 2-234801A | 9/1990 | Japan . | |
| 393567 | 9/1931 | United Kingdom ............. 301/110.6 |
| 2130536A | 11/1982 | United Kingdom . | |
| 8303389 | 10/1983 | WIPO .............................. 301/110.5 |

Primary Examiner—Russell D. Stormer
Attorney, Agent, or Firm—Michael, Best & Friedrich

[57] ABSTRACT

A motorcycle wheel has a hub, a rim, and a plurality of wire spokes extending between the hub and the rim. The hub comprises, a pair of opposed, unitary hub members, each of which includes a tubular body portion and a bowl-shaped spoke flange extending integrally from each of the body portions. A plurality of spaced apart spoke holes are formed in each of the spoke flanges and each is positioned for receiving one end of one of the spokes. A plurality of coupling members extend from the inner end of each body portion and are engageable when the hub members are placed end-to-end for coupling the hub members and for properly orienting the positions of the spoke holes in the spoke flange on one member relative to those on the other.

10 Claims, 1 Drawing Sheet

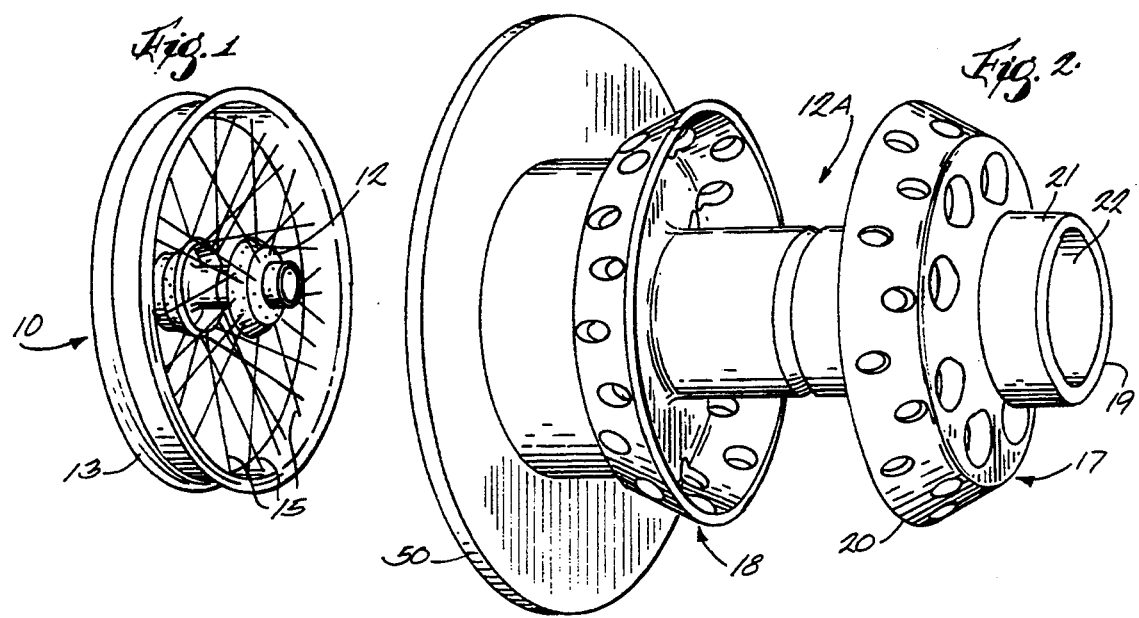
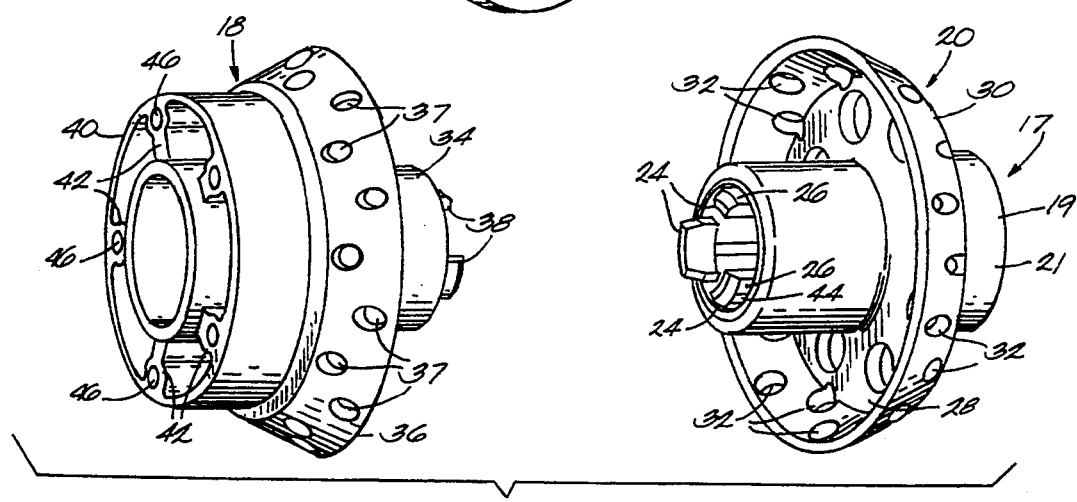
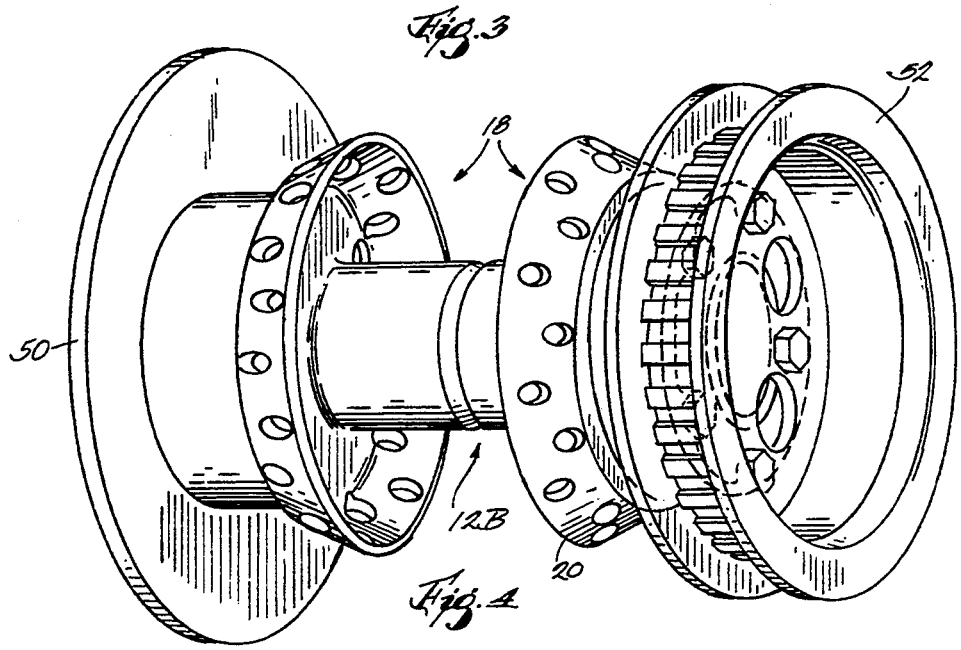

LACED WHEEL HUB

BACKGROUND OF THE INVENTION

This invention relates to motorcycles and more particularly hubs for motorcycle wheels.

For traditional and aesthetic reasons, motorcycles are commonly equipped with spoked wheels. These wire spokes extend from hub flanges on either side of the wheel and each of which has a predetermined array of holes for receiving one end of the spokes. In addition, motorcycle wheel hubs also commonly include a support for brake discs and the rear wheel hub also commonly includes a support for a drive sprocket. As a result, prior art motorcycle wheel hubs consisted of a number of components which were welded or otherwise joined into a unitary member. This requires a number of expensive and time consuming assembly and manufacturing steps to insure proper positioning and alignment of parts.

SUMMARY OF THE INVENTION

It is an object of the invention to provide a new and improved motorcycle wheel hub.

Another object of the invention is to provide a motorcycle wheel hub which is relatively easy to manufacture and assemble.

A further object of the invention is to provide a motorcycle wheel hub which requires a minimum of manufacturing and assembling operations.

Yet another object of the invention is to provide a motorcycle wheel hub having a relatively few interchangeable parts.

These and other objects and advantages of the present invention will become more apparent from the detailed description thereof taken with the accompanying drawings.

In general terms, the invention comprises motorcycle wheel having a hub, a rim, and a plurality of wire spokes extending between the hub and the rim. The hub comprises, a pair of opposed, unitary hub members, each of which includes a tubular body portion, a spoke flange extending integrally from each of the body portions and each having a plurality of spaced apart spoke holes formed therein and each positioned for receiving one end of a spoke. A coupling means is formed on the inner end of each body portion for engaging the coupling means on the other hub member for coupling the members and properly positioning the spoke holes on one member relative to those on the other.

BRIEF DESCRIPTION OF THE DRAWINGS

FIG. 1 shows a motorcycle wheel incorporating a hub according to one embodiment of the invention;

FIG. 2 shows a wheel hub assembly for a front motorcycle wheel;

FIG. 3 is an exploded view of the wheel hub assembly illustrated in FIG. 2; and

FIG. 4 shows a wheel hub assembly for a rear motorcycle wheel.

DETAILED DESCRIPTION OF THE PREFERRED EMBODIMENT

FIG. 1 shows a spoked motorcycle wheel 10 consisting of a hub 12, a rim 13 and a plurality of wire spokes 15 extending from the hub 12 to the rim 13. Those, skilled in the art will appreciate that the rim is constructed for receiving an inflatable tire (not shown) and that the hub 12 is hollow for receiving a conventional bearing and axle (not shown).

FIGS. 2 and 3 show a wheel hub 12A for a front motorcycle wheel to comprise a first unitary wheel hub member 17 and a second unitary wheel hub member 18. The first member 17 includes a hollow tubular central body portion 19 and an integral spoke flange 20. The body portion 19 has a generally cylindrical outer surface 21 and a cylindrical open ended bore 22 for receiving a bearing and axle (not shown) which are known in the art. At the inner end of the body portion 19 there are a plurality of spaced apart coupling members 24 extending axially outwardly from the bore 22 and each member 24 has an arcuate outer surface 26 which is complimentary to the surface of the bore 22. While any suitable number of coupling members may be employed, in the illustrated embodiment three members are shown.

The spoke flange 20 is generally bowl shaped and includes an annular base portion 28 and a rim portion 30 extending obliquely outwardly at an angle relative to the axis of the body portion 19. Two rows of spoke holes 32 are formed in a spaced apart staggered relation in the rim 30 for receiving one end of the spokes 15.

FIG. 3 shows the second hub member 18 which also includes a hollow tubular body portion 34 and a spoke flange 36 having rows of spoke holes 37. At the inner end of the body member 34 there are three axially extending coupling members 38 which are complementary to the coupling members 24. The second hub member 18 identical to the hub member 17 except that it includes a larger diameter collar 40 mounted in spaced relation relative to the body portion 18 by a plurality of radially extending bridging sections 42. Each of the bridging sections 42 has a threaded hole 46 whose purpose will be described below. As seen in FIG. 3, one of the coupling members 24 has an index mark 44 formed on its outer surface. Similarly, one of the coupling members 38 of the hub member 18 has a similar indexing mark (not shown). In addition, the coupling members 24 and 38 are so spaced that when the index mark 44 on member 17 is 180° apart from the corresponding index mark on member 18, the members 17 and 18 can be joined by sliding the ends of the tubular body portions 21 and 34 end to end with the coupling members 24 and 38 sliding between each other and meshing to define a driving connection- The parts may then be welded to provide a unitary hub as shown in FIG. 3. Moreover, when the members 17 and 18 are joined in this manner, the spoke holes 32 in hub member 17 are correctly oriented relative to the spoke holes 37 in member 18.

FIG. 2 shows a front wheel hub consisting of hub members 17 and 18 with a brake disc 50 mounted on member 18. FIG. 4 shows a rear wheel hub formed from a pair of hub members 18. A brake disc 50 is mounted on one of the members 18 and a drive sprocket 52 is mounted on the other. The brake discs 50 and the drive sprocket 52 are mounted by means of screws 54 which pass through suitable openings in these members and are threadably received in the holes 46 in bridgings sections 42. The brake disc 50 or drive sprocket 52 are supported on the rims of the body portion 34 and the sleeve 40 which define a planer surface.

FIGS. 2 and 4 illustrate how hub members 17 and 18 can be used to form either front or rear wheel hubs. Moreover, because of the indexing provided by the coupling members 24 and 38, the spoke holes 32 or 37 will always be properly oriented. In this manner, proper alignment of parts is maintained with a minimum of assembly operations.

While only a single embodiment of the invention has been illustrated and described, it is not intended to be limited thereby but only by the scope of the appended claims.

I claim:

1. A hub for a motorcycle wheel having a rim and a plurality of wire spokes extending between the hub and the rim, said hub comprising a pair of opposed, unitary hub members, each hub member including a hollow tubular body portion, open in at least one end thereof, a spoke flange extending integrally from each of said body portions and each having a plurality of spaced apart spoke holes formed therein, each of said spoke holes being positioned for receiving one end of one of said spokes, each body portion having an inner and an outer end, a plurality of spaced apart coupling means extending from the inner end of each body portion for being received within the open end of the tubular body portion of the other hub member and between the coupling means on the other hub member for coupling said members, said coupling means being constructed and arranged so that when two of said hub members are coupled the positions of the spoke holes in the spoke flange on one member are properly positioned with those on the other.

2. The hub set forth in claim 1 wherein said coupling means comprises a plurality of spaced apart coupling members extending axially from the inner end of each body portion, the coupling members on each hub member being receivable within the body portion of the other hub member and between the coupling members extending therefrom to provide a driving connection for the transfer of torque therebetween.

3. The hub set forth in claim 2 wherein said hub is cast.

4. The hub set forth in claim 1 wherein said hub members are each molded.

5. The motorcycle wheel set forth in claim 1 wherein at least one of said hub members includes means for mounting a brake disk or a drive sprocket on the outer end thereof.

6. The hub set forth in claim 1 wherein each of said spoke flanges is bowl shaped and has an outer rim, said spoke holes being formed in said rim.

7. The motorcycle wheel hub set forth in claim 1 wherein said coupling means comprises a plurality of spaced apart coupling members extending axially from the inner end of each body portion, the coupling members on each hub member being receivable within the body portion of the other hub member and between the coupling members extending therefrom to provide a driving connection for the transfer of torque therebetween, each of said spoke flanges having an outer rim, said spoke holes being formed in said rim.

8. The motorcycle wheel hub set forth in claim 7 wherein said hub members are each molded.

9. The motorcycle wheel hub set forth in claim 7 wherein said hub members are cast.

10. The motorcycle wheel hub set forth in claim 7 wherein at least one of said members includes means for mounting a brake disk or a drive sprocket on the outer end thereof.

* * * * *